United States Patent
Bleizeffer et al.

(10) Patent No.: US 6,539,371 B1
(45) Date of Patent: Mar. 25, 2003

(54) SYSTEM AND METHOD FOR FILTERING QUERY STATEMENTS ACCORDING TO USER-DEFINED FILTERS OF QUERY EXPLAIN DATA

(75) Inventors: Terry Michael Bleizeffer, Durham, NC (US); Tanya Couch, San Jose, CA (US); Catherine Elizabeth Wuebker Drummond, Morgan Hill, CA (US); Virginia Walbridge Hughes, Jr., Hollister, CA (US); Theresa Hsing Lai, Saratoga, CA (US); Joseph Davis Lea, III, Chapel Hill, NC (US); David Harold Oberstadt, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,597

(22) Filed: Jan. 13, 2000

Related U.S. Application Data

(63) Continuation-in-part of application No. 08/949,636, filed on Oct. 14, 1997, now Pat. No. 6,243,703.

(51) Int. Cl.⁷ .............................................. G06F 17/30
(52) U.S. Cl. .............................. 707/2; 707/4; 707/104.1
(58) Field of Search ................................ 707/1, 2, 3, 4, 707/104.1

(56) References Cited

U.S. PATENT DOCUMENTS

| | | | | |
|---|---|---|---|---|
| 5,091,852 A | * | 2/1992 | Tsuchida et al. ............... 707/2 |
| 5,345,585 A | | 9/1994 | Iyer et al. ...................... 707/2 |
| 5,761,663 A | | 6/1998 | Lagarde et al. ................ 707/10 |
| 5,826,076 A | | 10/1998 | Bradley et al. ................ 707/4 |
| 5,832,500 A | | 11/1998 | Burrows ....................... 707/103 |
| 5,832,501 A | * | 11/1998 | Kain, III et al. ............. 707/103 |
| 5,864,863 A | | 1/1999 | Burrows ....................... 707/103 |
| 5,974,410 A | * | 10/1999 | Copeland et al. ............... 707/3 |
| 6,195,653 B1 | * | 2/2001 | Bleizeffer et al. ............... 707/2 |

OTHER PUBLICATIONS

Method for Optimizing for N Rows in a Database Management System; IBM Technical Disclosure Bulletin; vol. 38 No. 12, Dec. 1995; p. 317.

Dynamic Ordering of Joined Rows Using Fields from Multiple Tables; IBM Technical Disclosure Bulletin; vol. 36 No. 11, Nov. 1993; pp. 363–366.

DB2 Cost Formula; IBM Technical Disclosure Bulletin; vol. 34 No. 12, May 1992; pp. 389–394.

Multiple Indexed Access Path in a Relational Database System; IBM Technical Disclosure Bulletin; vol. 32 No. 10B, Mar. 1990; pp. 388–392.

Access Path Selection in a Relational Database Management System; IBM Technical Disclosure Bulletin; vol. 22 No. 4, Sep. 1979; pp. 1657–1660.

\* cited by examiner

Primary Examiner—Greta Robinson
(74) Attorney, Agent, or Firm—Madson & Metcalf

(57) ABSTRACT

An apparatus for filtering a set of query statements according to query explain data associated therewith includes a processor for executing instructions and a memory device having thereon modules of operational data and executable code for execution by the processor. The modules include a filter generation module configured to receive user-specified filtering criteria directed to a subset of the query explain data for at least one query statement and generate in response at least one user-defined filter. The modules also include a statement filtering module configured to apply the user-defined filter to the set of query statements to selectively exclude query statements not satisfying the filtering criteria of the at least one filter.

51 Claims, 18 Drawing Sheets

```
SELECT T1.NAME, T1.DEPT
  FROM T1, T2, T3
    WHERE T1.SALARY = T2.SALARY
    AND T2.DEPT = T3.DEPT
    AND T1.SALARY =
        (SELECT INCOME FROM T4
         WHERE LOCATION = STL)
```

RDBMS
54

74

| QUERYNO | 214 | 214 | 214 | 214 | etc. |
|---|---|---|---|---|---|
| QBLOCKNO | 1 | 1 | 1 | 2 | |
| APPLNAME | PLAN1 | PLAN1 | PLAN1 | PLAN2 | |
| PROGNAME | DNSEMPL1 | DNSEMPL1 | DNSEMPL1 | DNSEMPL1 | |
| PLANNO | 1 | 2 | 3 | 1 | |
| METHOD | 0 | 1 | 1 | 1 | |
| TNAME | T1 | T2 | T3 | T4 | |
| TABNO | 1 | 2 | 3 | 1 | |
| ACCESSTYPE | I | I | I | R | |
| MATCHCOLS | 1 | 1 | 1 | 1 | |
| ACCESSNAME | IDX1 | IDX2 | IDX3 | IDX4 | |
| INDEXONLY | N | Y | Y | N | |
| SORTN_UNIQ | N | N | N | N | |
| SORTN_JOIN | N | N | N | N | |
| SORTN_ORDERBY | N | N | N | N | |
| SORTN_GROUPBY | N | N | N | N | |
| SORTC_UNIQ | N | N | N | N | |
| SORTC_JOIN | N | N | N | N | |
| SORTC_ORDERBY | N | N | N | N | |
| SORTC_GROUPBY | N | N | N | N | |
| PREFETCH | L | | | | |
| MIXOPSEQ | 0 | 0 | 0 | 0 | |
| etc. | | | | | |

Fig. 4

SYSTEM AND METHOD FOR FILTERING QUERY STATEMENTS ACCORDING TO USER-DEFINED FILTERS OF QUERY EXPLAIN DATA

RELATED APPLICATIONS

This application is a continuation-in-part of U.S. patent application Ser. No. 08/949,636, filed Oct. 14, 1997 now U.S. Pat. No. 6,243,703, for "Interpreting Data Using User Interface," which is incorporated herein by reference.

BACKGROUND OF THE INVENTION

1. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. The Field of the Invention

The present invention relates generally to computer-implemented database systems. More specifically, the present invention relates to a system and method for filtering query statements according to user-defined filters of query explain data.

3. The Relevant Technology

Databases are computerized information storage and retrieval systems. A Relational Database Management System (RDBMS) is a database system which uses relational techniques for storing and retrieving data. Relational databases are organized into tables consisting of rows (tuples) and columns of data. A database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

The SQL standard provides that each RDBMS should respond to a particular query in the same way, regardless of the underlying database. However, the method that the RDBMS actually uses to find the requested information in the database is left to the RDBMS. Typically, there is more than one method that can be used by the RDBMS to access the requested data. The RDBMS, therefore, attempts to select the method that minimizes the computer time and resources (i.e. cost) for executing the query.

The RDBMS determines how to execute the SQL statements. The set of steps created by the RDBMS for executing the SQL statements is commonly referred to as the "access path." In other words, the access path is a sequence of operations used by the RDBMS to obtain the data requested by the SQL query. Depending on the access path, an SQL statement might search an entire table space, or, alternatively, it might use an index. The access path is the key to determining how well an SQL statement performs. The description of the access path is stored in a plan table, which typically stores the access path data for a plurality of SQL statements.

In addition to determining the access path, some databases estimate the cost for executing each SQL statement. The estimated costs are typically stored in a statement table (as in the case of DB2® for OS/390®) or a similar table within the database. Like the plan table, the statement table stores the estimated statement costs for a plurality of SQL statements.

Databases also typically include statistics for such database objects as table spaces, indexes, tables, and columns. For example, in the case of a table, the statistical data may include the number of pages that contain rows of the table, the number of rows and columns in the table, as well as various other statistical data. The statistics are typically derived from the RDBMS "catalog," which is an object that describes the entire database.

The above-described access path data, statement cost data, and object statistics data (referred to collectively as "query explain data") assist the user in analyzing and improving the performance of SQL statements. For example, a query with a higher-than-average statement cost might alert the user to inefficiencies in the access path. By viewing the access path data, the user can selectively make changes to the query and/or the database, such as by adding an index in order to avoid a table space scan. The object statistics data similarly assists the user by describing the structure and organization of the database.

Unfortunately, analyzing SQL query performance is currently too time-consuming and complex for the average user. Typical systems include hundreds or thousands of query statements. Identifying the one or more statements that need to be improved can be a difficult task. In conventional systems, the user must manually locate the relevant query explain data in a plurality of tables, e.g. the plan table, the statement table, the function table, and the catalog tables, which can be tedious and time-consuming.

Moreover, each of the tables typically stores information corresponding to many different statements and objects. Consequently, the tables are often very large, making it difficult to locate the desired data. Likewise, the tables are often cryptic and hard to understand, even for database experts. For example, the plan table typically includes sixty or more columns and hundreds or thousands of rows. The access path data is stored in a tabular format, which, although easily understood by the RDBMS, is often too complicated to be effectively analyzed.

Accordingly, what is needed is a system, method, and article of manufacture for reducing a list of query statements based on a user's customized requirements for improving SQL performance. Moreover, what is needed is a system, method, and article of manufacture for filtering query statements according to user-defined filters of query explain data. What is also needed is a system, method, and article of manufacture for generating user-defined filters of object reference data, statement cost data, and access path data. Additionally, what is needed is a system, method, and article of manufacture for storing and retrieving sets of user-defined filters.

SUMMARY OF THE INVENTION

The present invention solves the foregoing problems by providing a system, method, and article of manufacture for filtering query statements according to user-defined filters of query explain data.

In one aspect of the invention, an apparatus for filtering a set of query statements according to query explain data associated therewith includes a processor for executing instructions and a memory device having thereon modules of operational data and executable code for execution by the processor. In one embodiment, the modules include a filter generation module configured to receive user-specified filtering criteria directed to a subset of the query explain data for at least one query statement and generate in response at least one user-defined filter. In one embodiment, the modules also include a statement filtering module configured to apply the user-defined filter to the set of query statements to selectively exclude query statements not satisfying the filtering criteria of the at least one filter.

In another aspect of the invention, a method for filtering a set of query statements according to query explain data associated therewith includes the step of receiving user-specified filtering criteria directed to a subset of the query explain data for at least one query statement and generating in response at least one user-defined filter. In one embodiment, the method also includes the step of applying the user-defined filter to the set of query statements to selectively exclude query statements not satisfying the filtering criteria of the at least one filter.

In yet another aspect of the invention, an article of manufacture comprises a program storage medium readable by a processor and embodying one or more instructions executable by the processor to perform the above-described method for filtering query statements according to user-defined filters of query explain data.

These and other objects, features, and advantages of the present invention will become more fully apparent from the following description and appended claims, or may be learned by the practice of the invention as set forth hereinafter.

BRIEF DESCRIPTION OF THE DRAWINGS

These and other more detailed and specific objects and features of the present invention are more fully disclosed in the following specification, reference being had to the accompanying drawings, in which

FIG. 4 is an illustration of a query statement and a portion of a plan table according to one embodiment of the invention;

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 1 through 18, is not intended to limit the scope of the invention, as claimed, but is merely representative of presently preferred embodiments of the invention.

The Figures include schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
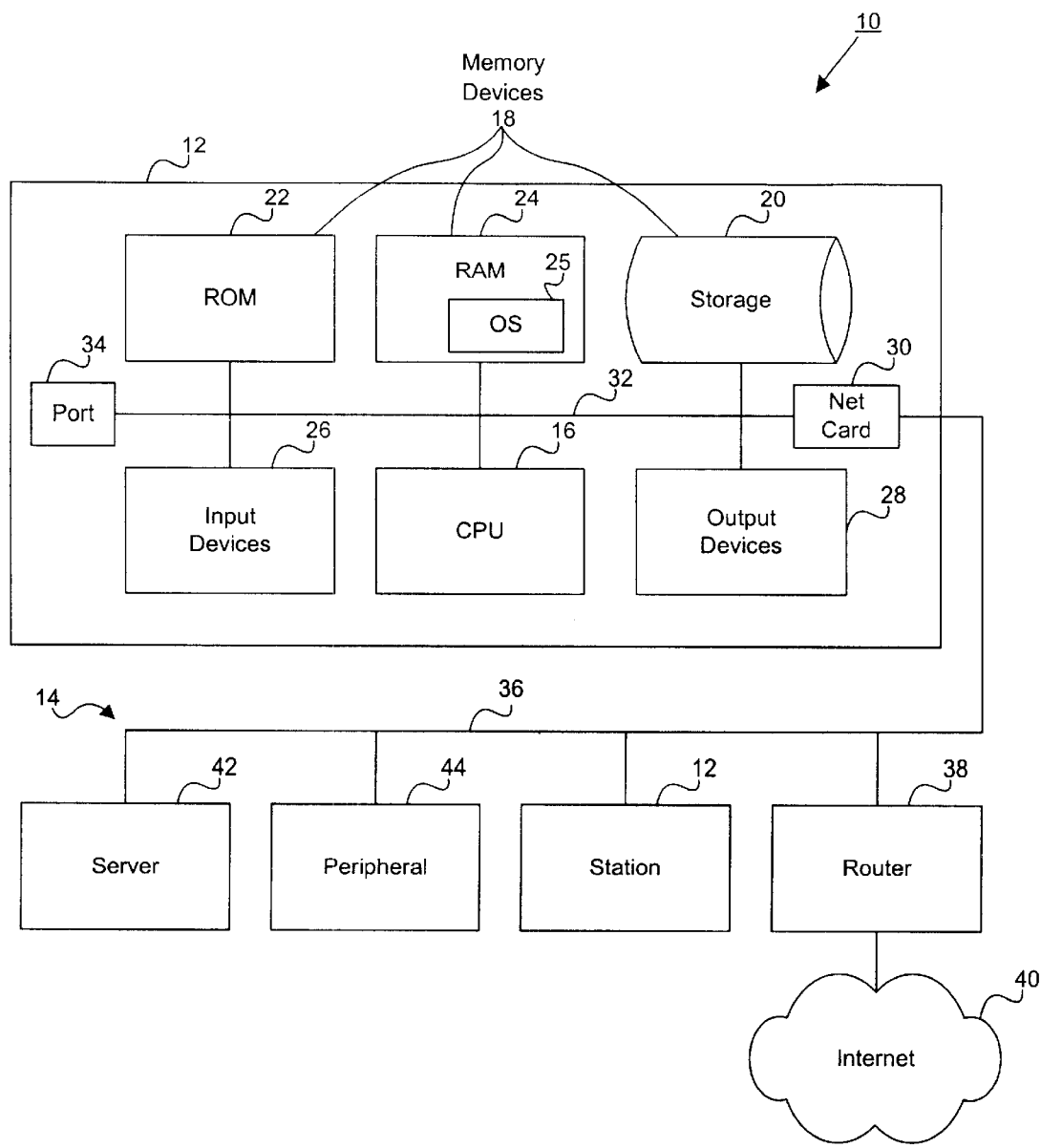
FIG. 1 is a schematic block diagram of a computer system suitable for implementing one embodiment of the invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIX®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
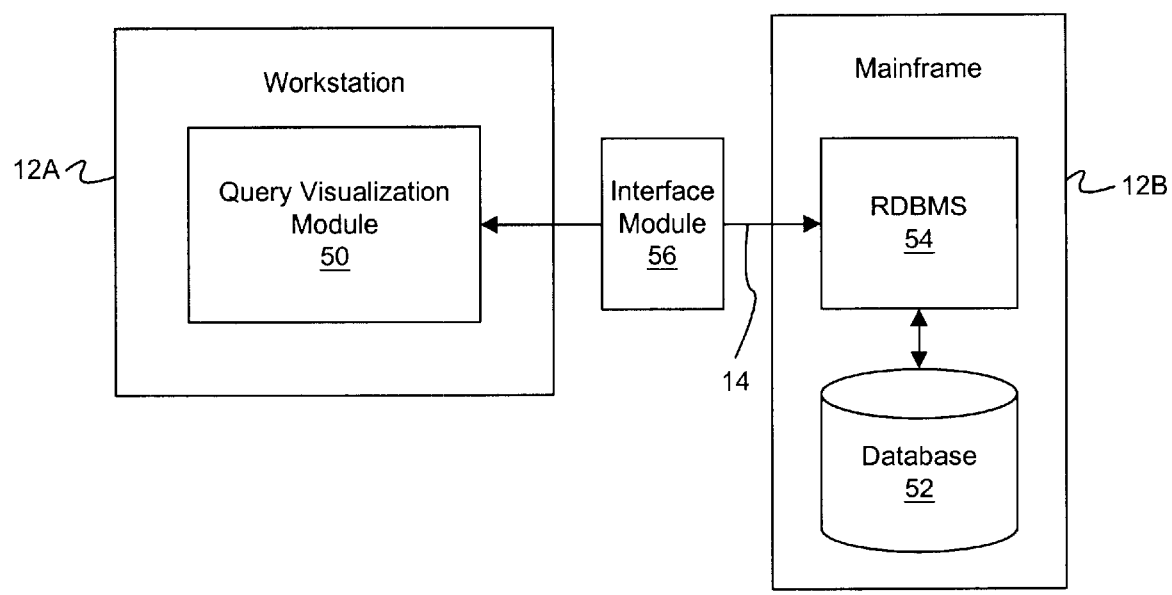
FIG. 2 is a schematic block diagram of a system for filtering query statements according to user-defined filters of query explain data according to one embodiment of the invention.

Referring now to FIG. 2, a schematic block diagram of one embodiment of the invention includes first and second stations 12A, 12B. The first station 12A is preferably a workstation-class computer, such as a PC workstation, available from IBM Corporation. The second station 12B is preferably an IBM mainframe computer operating under MVS® or OS/390®. In one embodiment, the stations 12A, 12B are coupled via a network 14 using a distributed remote data architecture (DRDA). Those skilled in the art, however, will recognize that the invention may be implemented using a variety of computing platforms and/or network architectures.

In one embodiment, the first station 12A includes a query visualization module 50, which is a tool that assists a user in visualizing or otherwise understanding query explain data for one or more queries to be executed. As described above, the query explain data includes, in one embodiment, the access path data, the statement cost data, and the object statistics data used in analyzing and improving the performance of SQL statements.

The second station 12B preferably stores the database 52, as well as an RDBMS 54 for managing a database 52, such as DB2® for OS/390®, available from IBM. As used herein, the term "database" may generically refer to a combination of the RDBMS 54 and the database 52. In one embodiment, the query visualization module 50 and the RDBMS 54 are linked via an interface module 56, such as DB2 Connect®, also available from IBM.

Figure 3:
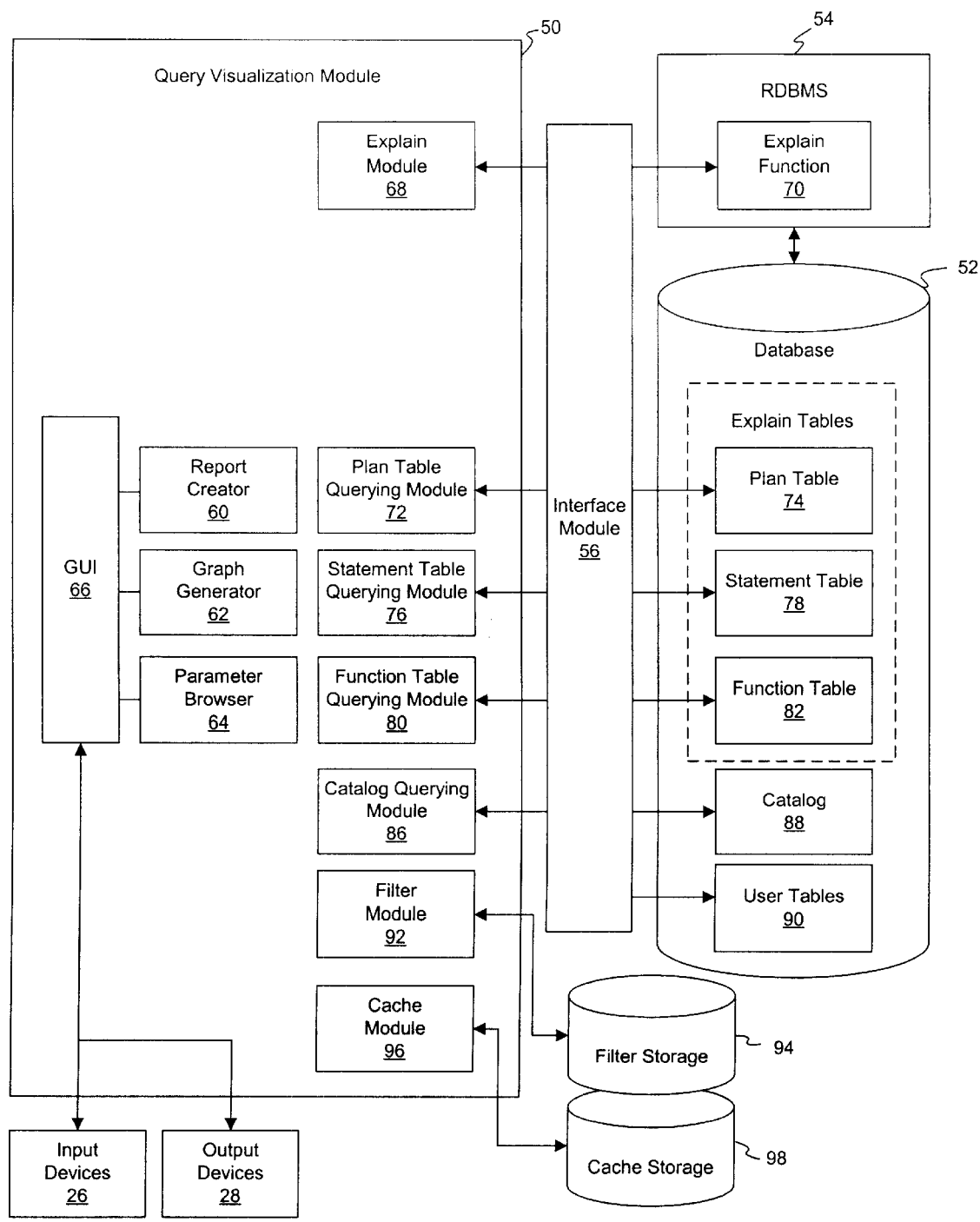
FIG. 3 is a schematic block diagram of a query visualization module according to one embodiment of the invention.

Referring now to FIG. 3, the query visualization module 50 preferably includes a plurality of modules containing executable and operational data suitable for operation within the memory devices 18 of FIG. 1. Of course, the memory devices 18 in which the modules of the present invention are located may also be distributed across both local and remote computer stations 12. Likewise, two or more illustrated modules may be integrated into a single module, or the function of a single module could be performed by a group of modules, without departing from the scope of the invention.

The principal components of the query visualization module 50 include a report creator 60, a graph generator 62, and a parameter browser 64. The above-described modules are, in one embodiment, intended to help the user to better understand the query explain data, the subsystem parameters, and the like in a variety of ways.

For example, the report creator 60 in one embodiment selectively prepares a report of the access path data, statement cost data, and object statistics data in an easily understood, text-based format. The user may be provided with the option of selecting one or more query statements, as well as subsets of the query explain data for the selected query statements to include in the report. The report provides the user with the requested query explain data in a centralized and readily understood format, allowing the user to efficiently analyze and improve SQL query performance. The report creator 60 is more fully described in co-pending U.S. application Ser. No. 09/482,595, filed Jan. 13, 2000, now U.S. Pat. No. 6,195,653B1 "System and Method for Selectively Preparing Customized Reports of Query Explain Data," which is commonly assigned and is incorporated herein by reference.

A second principal component of the query visualization module 50 in one embodiment is the graph generator 62, which prepares a graphical representation of the access path of a query statement. The graph generator 62 is more fully described in co-pending application Ser. No. 08/949,636 now U.S. Pat. No. 6,243,703, filed Oct. 14, 1997, for "Interpreting Data Using a Graphical User Interface," which is incorporated herein by reference. FIG. 4 illustrates an exemplary SQL query statement, processed by an RDBMS 54 to generate access path data, and stored within a plan table 74 according to one embodiment of the present invention.

Figure 5:
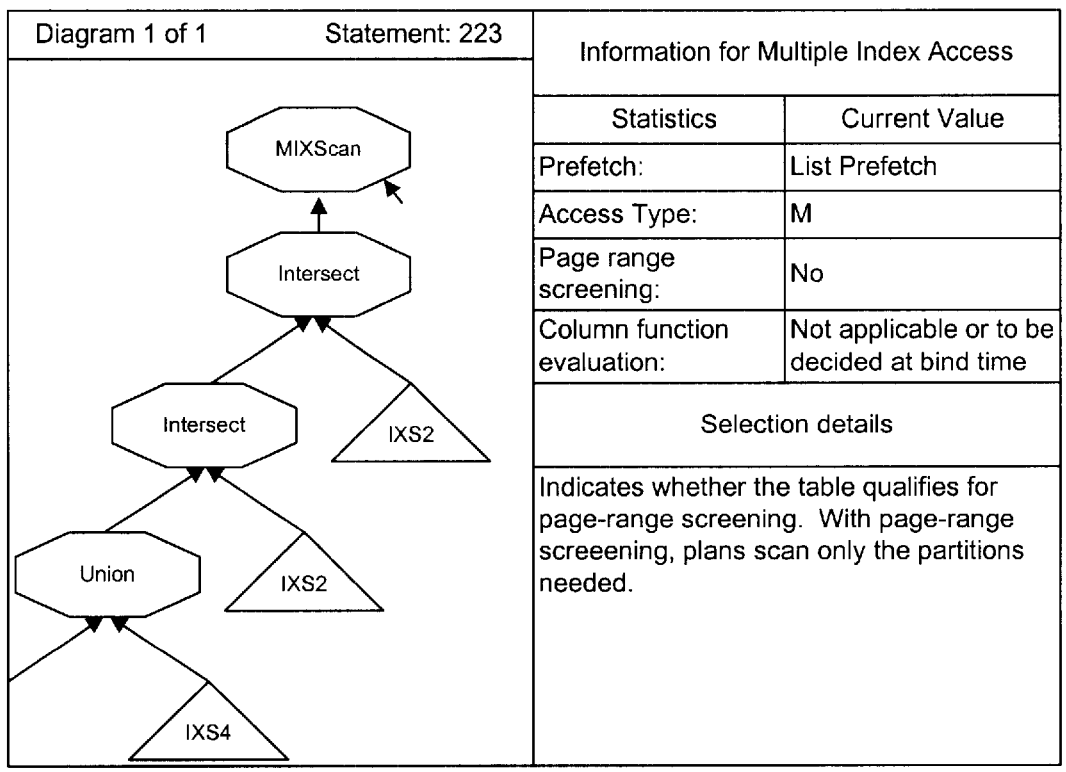
FIG. 5 is an illustration of a graphical representation of an access path according to one embodiment of the invention.

As shown in FIG. 5, the graph generator 62 in one embodiment uses the plan table 74 to generate a graphical representation of the access path. Preferably, access path steps of an SQL statement are graphically represented as nodes within a tree-like structure. Tables, indexes, and operations are graphically represented with unique symbols that indicate the item being represented. For example, rectangles represent tables, triangles represent indexes, and octagons represent operations such as table space scans, index scans, joins, etc. The graphical representation shows the relationship between the database objects and the operations. When the user selects a node of the graphical representation, detailed information related to the selected node is displayed on the right side of the display.

Referring again to FIG. 3, a third principal component of the query visualization module 50 in one embodiment is the parameter browser 64. Preferably, the parameter browser 64 allows a user to selectively view the subsystem parameters, for example, DSNZPARM and DSNHDECP values, used by a subsystem, as well as the install panel names and fields. Access to subsystem parameters is useful in analyzing the performance of query statements. Like the graph generator 62, the parameter browser 64 is more fully described in co-pending application Ser. No. 08/949,636 now U.S. Pat. No. 6,243,703, filed Oct. 14, 1997, for "Interpreting Data Using a Graphical User Interface."

The report creator 60, graph generator 62, and parameter browser 64 are each preferably coupled to a graphical user interface (GUI) module 66. Preferably, the GUI module 66 is operably coupled to the input and output devices 26, 28 to allow the user to interact with the report creator 60, graph generator 62, and parameter browser 64.

The query visualization module 50 in the depicted embodiment also includes an explain module 68, which invokes a corresponding explain function 70 in the RDBMS 54. When invoked, the explain function 70 causes the RDBMS 54 to generate access path data, statement cost data, and function data (referred to herein as "explain data") for a specified query statement. As noted above, the explain data is a subset of the query explain data.

Explainable query statements include SELECT (except for SELECT INTO) and INSERT statements, and the searched form of UPDATE and DELETE statements. The explain module 68 is used to invoke the explain function 70 in which the RDBMS 54 immediately generates explain data for a specific SQL statement. This feature is useful for interactively testing specified SQL statements. Alternatively, the RDBMS 54 generates the explain data at bind time in the context of an application or package upon encountering an EXPLAIN(YES) option of the BIND command.

In one embodiment, the query visualization module 50 includes a plurality of querying modules for querying various tables in the database 52. For example, a plan table querying module 72 queries a plan table 74 to obtain access path data. Likewise, a statement table querying module 76 queries a statement table 78 to obtain statement cost data. A function table querying module 80 queries a function table 82 to obtain data concerning user-defined functions. The plan table 74, the statement table 78, and the function table 82 are collectively referred to herein as "explain tables." Finally, a catalog querying module 86 queries the RDBMS catalog 88 to obtain object statistics for one or more database objects contained within in a plurality of user tables 90.

Although the querying function is implemented herein by four separate modules, those skilled in the art will recognize that the described functionality may be implemented by fewer modules. Additionally, in one embodiment, the above-described modules use the interface module 56 when communicating with the RDBMS 54 and database 52.

Preferably, the query visualization module 50 also includes a filter module 92, which is described in greater detail below. In one embodiment, the filter module 92 allows a user to filter a list of explainable query statements according to various user-selected criteria, including statement costs, references to particular database objects, and the inclusion of particular steps in the access paths of the statements. Moreover, in one embodiment, the user may assign a name to a set of filtering criteria and save the named set in a filter storage 94. This allows the user to easily retrieve a specified set of filtering criteria such that only the explainable query statements satisfying the criteria are listed.

The query visualization module 50 also preferably includes a cache module 96, which caches portions of the above-described tables in a cache storage 98. For example, when the plan table querying module 72 retrieves access path data from the plan table 74, the access path data is preferably stored, and future accesses to the same data will be retrieved from the cache storage 98. Various methods may be employed for managing data in the cache storage 98, such as automatically deleting a percentage of the cached data when the amount of the data exceeds a pre-defined threshold.

Figure 6:
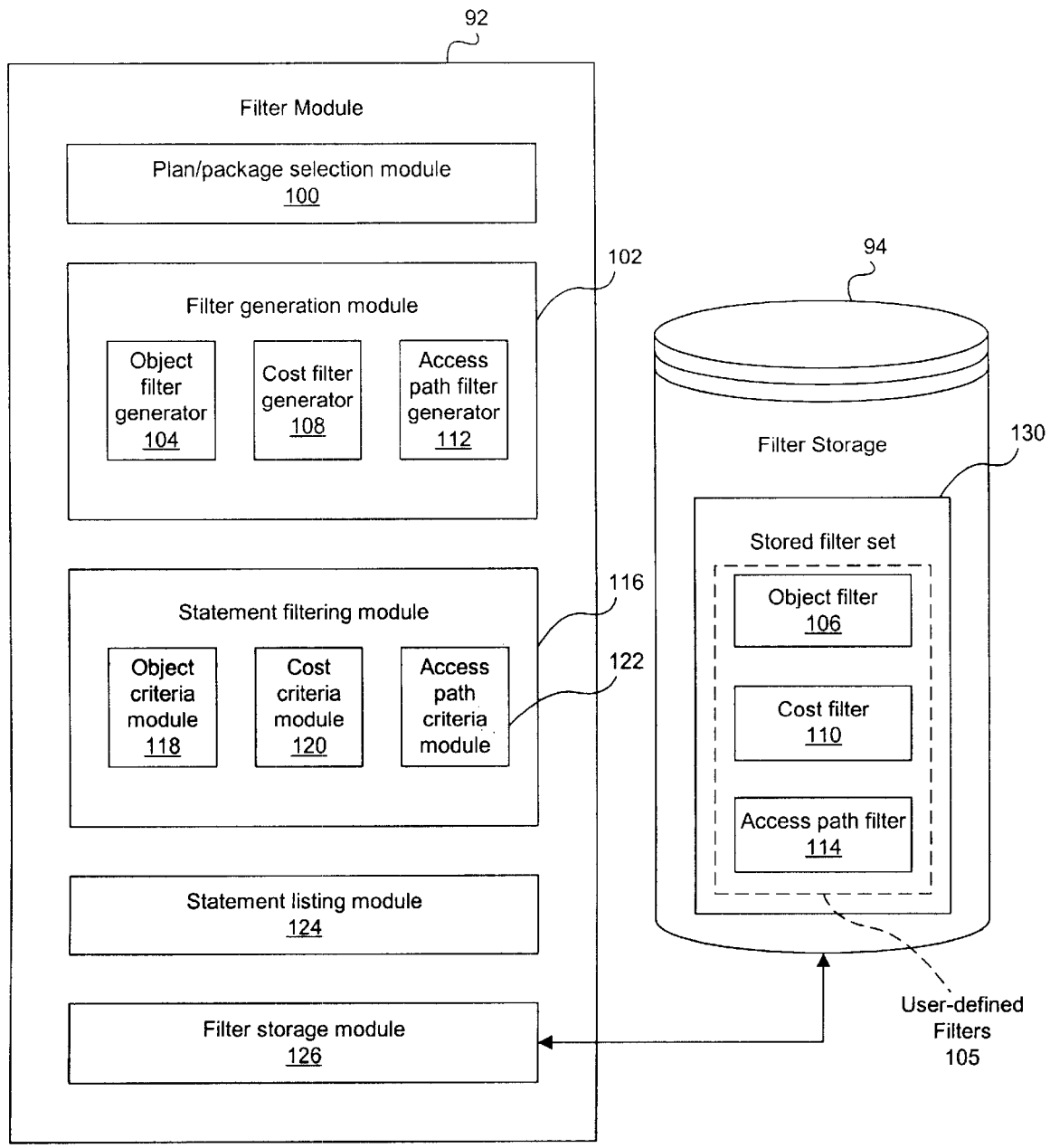
FIG. 6 is a schematic block diagram of a filter module according to one embodiment of the invention.

Referring now to FIG. 6, the filter module 92 preferably includes a plurality of modules containing executable and operational data suitable for operation within the memory devices 18 of FIG. 1. In one embodiment, the memory devices 18 in which the modules of the present invention are located may also be distributed across both local and remote computer stations 12. Likewise, two or more illustrated modules may be integrated into a single module without departing from the scope of the invention, and additional modules could be utilized to perform the same functions.

In one embodiment, the filter module 92 includes a plan/package selection module 100, which allows a user to select an initial set of query statements to be filtered. Briefly, a package comprises one or more query statements from a common application. Likewise, a plan is an assemblage of query statements, but may correspond to more than one application. The user may preferably select one or more plans or packages to create the initial set of query statements.

As described above, the initial set of query statements may be very large, particularly for a company-wide database. Consequently, it may be difficult for a user to locate a particular query statement, when, for example, the user wishes to select the statement for graphing, for SQL text display, for generation of a report containing the statement, or the like.

To alleviate this problem, the filter module 92 preferably includes a filter generation module 102. In one embodiment, the filter generation module 102 allows the user to create one or more filters for selectively reducing a list of query statements based on subsets of the query explain data previously generated for the statements by the RDBMS 54. These filters may be referred to collectively as user-defined filters 105. Each filter includes user-specified filtering criteria that are applied to the corresponding subset of the query explain data to selectively exclude from the initial set the query statements not satisfying the filtering criteria.

The filter generation module 102 preferably includes an object filter generator 104 for assisting a user in generating a user-defined object filter 106. In one embodiment, the object filter 106 includes filtering criteria for selectively excluding query statements from the initial set based on whether the query statements either reference a specified database object or reference an object created by a specified person.

Similarly, the filter generation module 102 also includes, in one embodiment, a cost filter generator 108 for assisting a user in generating a user-defined cost filter 110. The cost filter 110 preferably includes filtering criteria for selectively excluding query statements from the initial set based on how the statement cost data for each query statement compares with a specified threshold cost.

Likewise, the filter generation module 102 preferably includes an access path filter generator 112 for assisting a user in generating a user-defined access path filter 114. The access path filter 114 preferably includes filtering criteria for selectively excluding query statements from the initial set based on whether the statements include specified execution steps in their access paths. Other types of filter generators may also be added as needed.

To apply the foregoing filters, the filter module 92 preferably includes a statement filtering module 116. In one embodiment, the statement filtering module 116 applies the filtering criteria of the filters to subsets of the query explain data for the initial set of query statements.

In the depicted embodiment, the statement filtering module 116 includes an object criteria module 118 for applying the filtering criteria of an object filter 106. Preferably, the object criteria module 118 communicates with the plan table querying module 72 to obtain the access path data for each query statement from the plan table 74. From the access path data, the object criteria module 118 may determine whether each statement references a database object specified in the filtering criteria, such as a table, index, or the like.

Additionally, the statement filtering module 116 preferably includes a cost criteria module 120 for applying the filtering criteria of a cost filter 110. In one embodiment, the cost criteria module 120 communicates with the statement table querying module 76 to obtain the statement cost data for each query statement from the statement table 78. From the statement cost data, the cost criteria module 120 may determine whether each statement satisfies the filtering criteria of the cost filter 110.

In one embodiment, the statement filtering module 116 also includes an access path criteria module 122 for applying the filtering criteria of an access path filter 114. Preferably, the access path criteria module 122 communicates with the plan table querying module 72 to obtain the access path data for each query statement from the plan table 74. From the access path data, the access path criteria module 122 may determine whether the access path of each statement includes execution steps specified in the filtering criteria of the access path filter 114.

In one embodiment, the filter module 92 also includes a statement listing module 124. The statement listing module 124 preferably displays the filtered set of query statements to the user, additionally allowing the user to select one or more of the query statements for purposes of modifying the statements, including the statements in a report, explaining the query statements, or the like.

In one embodiment, the filter module 92 also includes a filter storage module 126. After the user has generated one or more filters, the filter storage module 126 preferably allows the user to store the filters as a set 130 in the filter storage 94. In one embodiment, the user may assign a name to a set 130 of filters in the filter storage 94. Later, the user may retrieve and use the stored filters without having to recreate them, as described in greater detail below.

Figure 7:
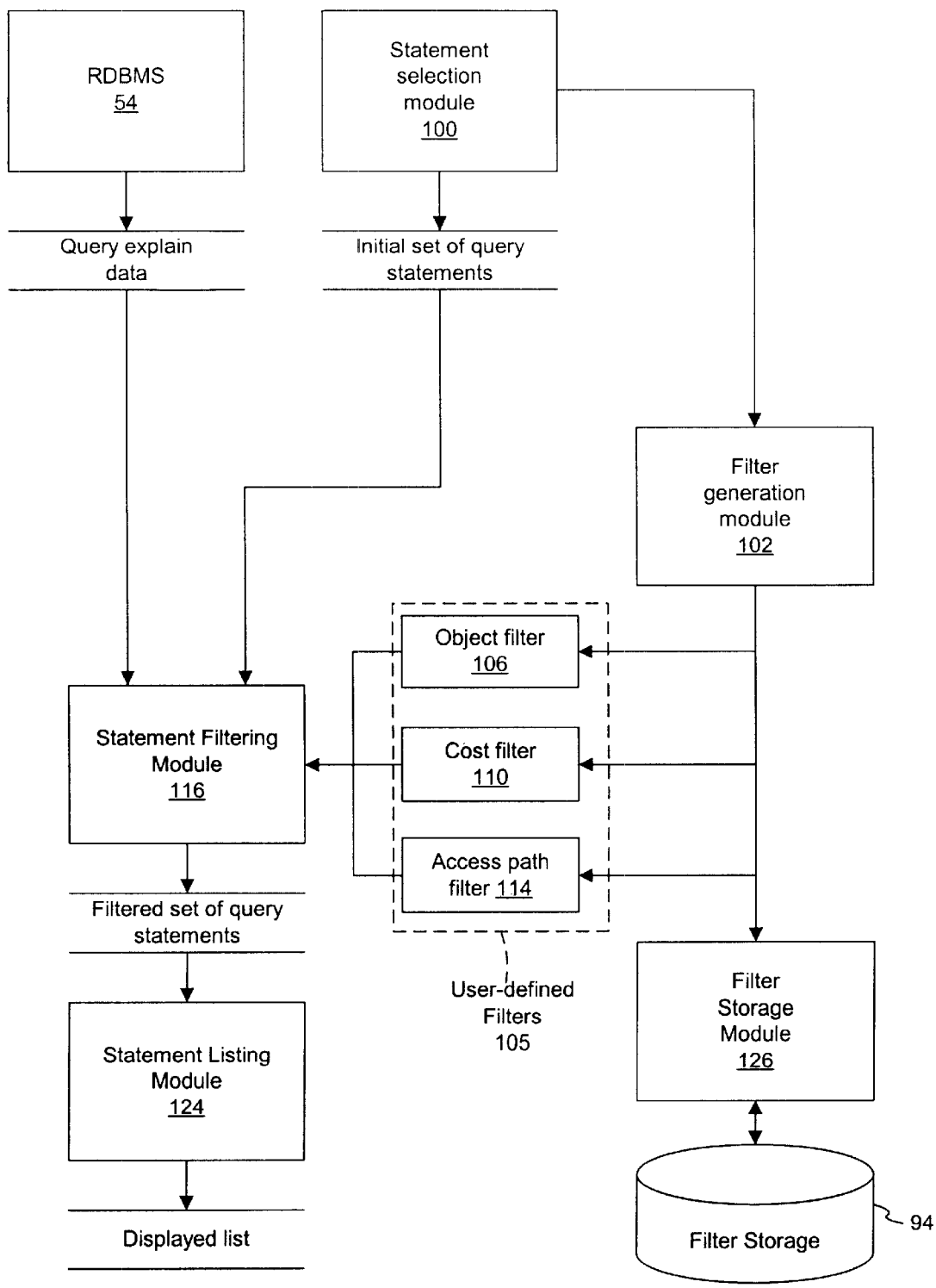
FIG. 7 is an illustration of the data flow within the filter module according to one embodiment of the invention.

FIG. 7 is an illustration of the data flow within the filter module 92 according to one embodiment of the invention. As described above, the RDBMS 54 generates query explain data for a plurality of query statements. Using the statement selection module 100, the user may select one or more plans and/or packages, which define an initial set of query statements to be filtered.

A user may, with the filter generation module 102, generates one or more filters, such as an object filter 106, a cost filter, and an access path filter 114. Optionally, the filters may be stored in the filter storage 94 by means of the filter storage module 126. Later, a user may retrieve the filters from the filter storage 94 in order to selectively reduce a list of query statements. In one embodiment, the filters may include the user's selection of the plans and/or packages.

In one embodiment, the statement filtering module 116 accepts as input the initial set of query statements, the query explain data for the statements, and one or more user-defined filters, either generated by the filter generation module 102 or retrieved from the filter storage 94. Using the techniques described above, the statement filtering module 116 applies the filtering criteria of each user-defined filter to selectively excluding from the initial set the query statements not satisfy the filtering criteria. Preferably, the statement filtering module 116 provides the filtered query statements to the statement listing module 124, which displays a list of the filtered query statements to the user.

Figure 8:
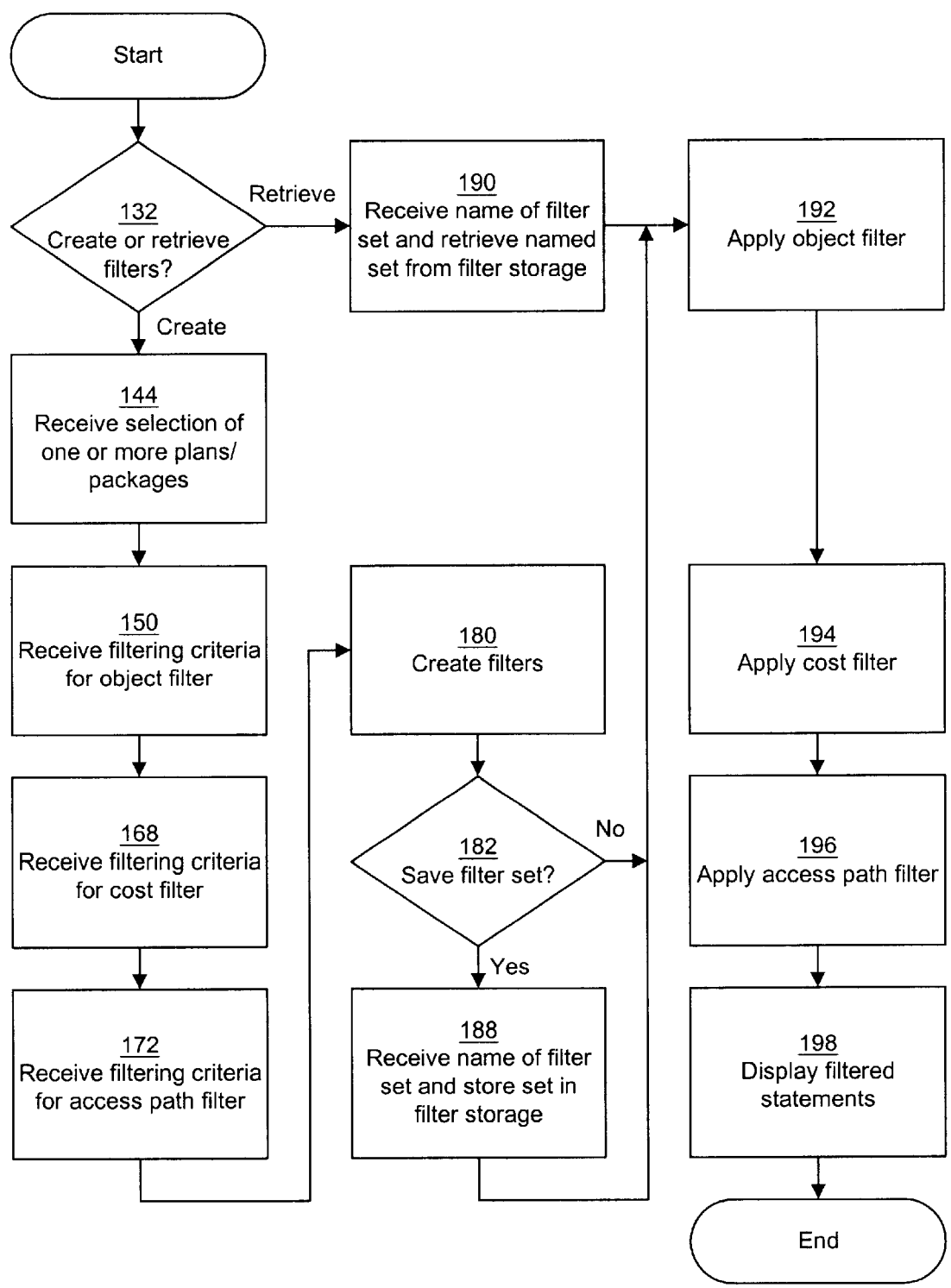
FIG. 8 is a schematic flow chart of a method for filtering query statements according to user-defined filters of query explain data.

Referring now to FIG. 8, a schematic flow chart illustrates a method of filtering query statements according to one embodiment of the invention. The method begins by determining 132 whether to create new filters or to retrieve a set 130 of stored filters. In the depicted embodiment, a user may create new filters by selecting a "new" button 146 or a similar control. Alternatively, a user may retrieve a set 130 of filters from the filter storage 94 by selecting the name of a set 130 from a pull-down menu 148 (of FIG. 10), which lists the names of the filter sets 130 stored in the filter storage 94.

If, in step 132 of FIG. 8, the user elects to create new filters, the method continues by receiving 134 a user's selection of one or more plans and/or packages. As noted above, a package corresponds to one or more query statements in a common application. Likewise, a plan is an assemblage of query statements, but may correspond to more than one application.

Figure 9:
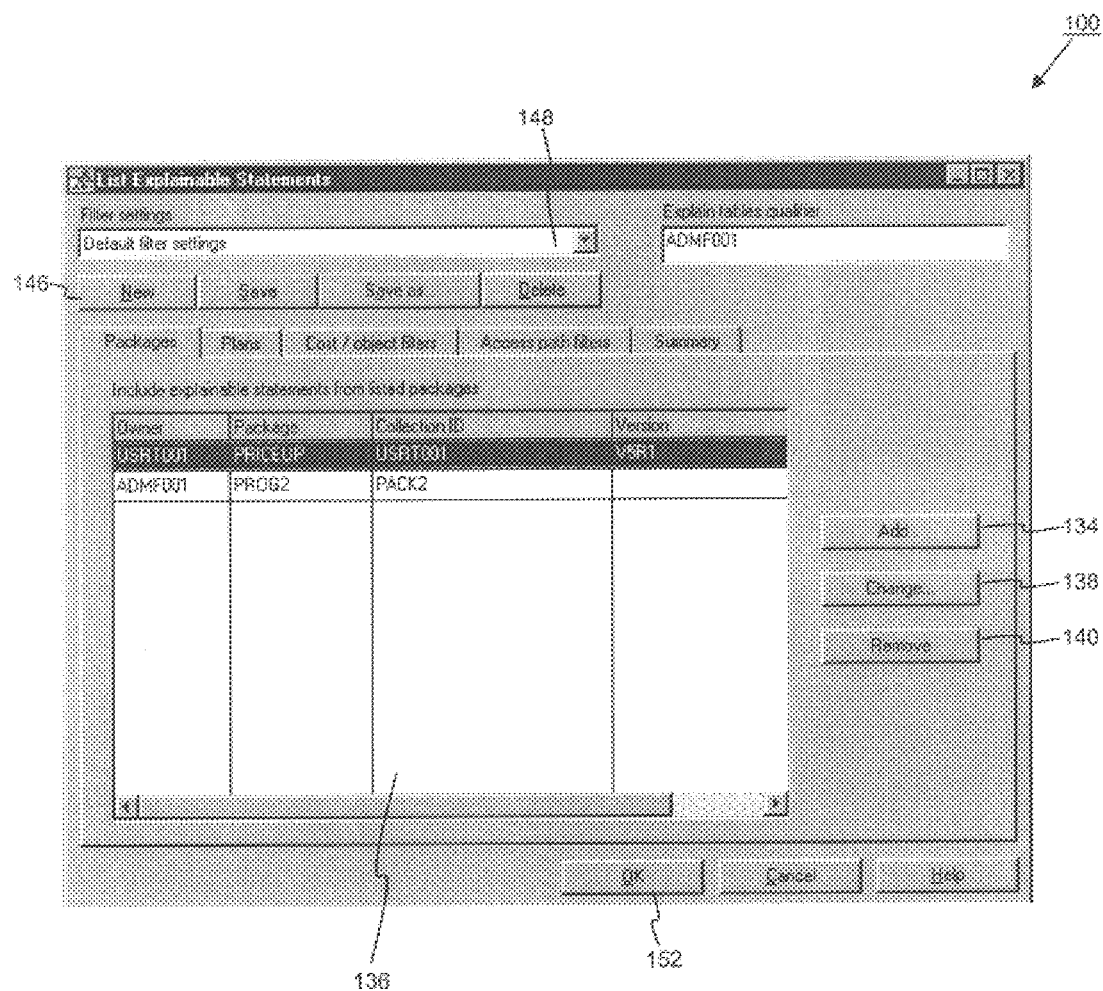
FIG. 9 is an illustration of an interactive display provided by a plan/package selection module according to one embodiment of the invention.
Figure 10:
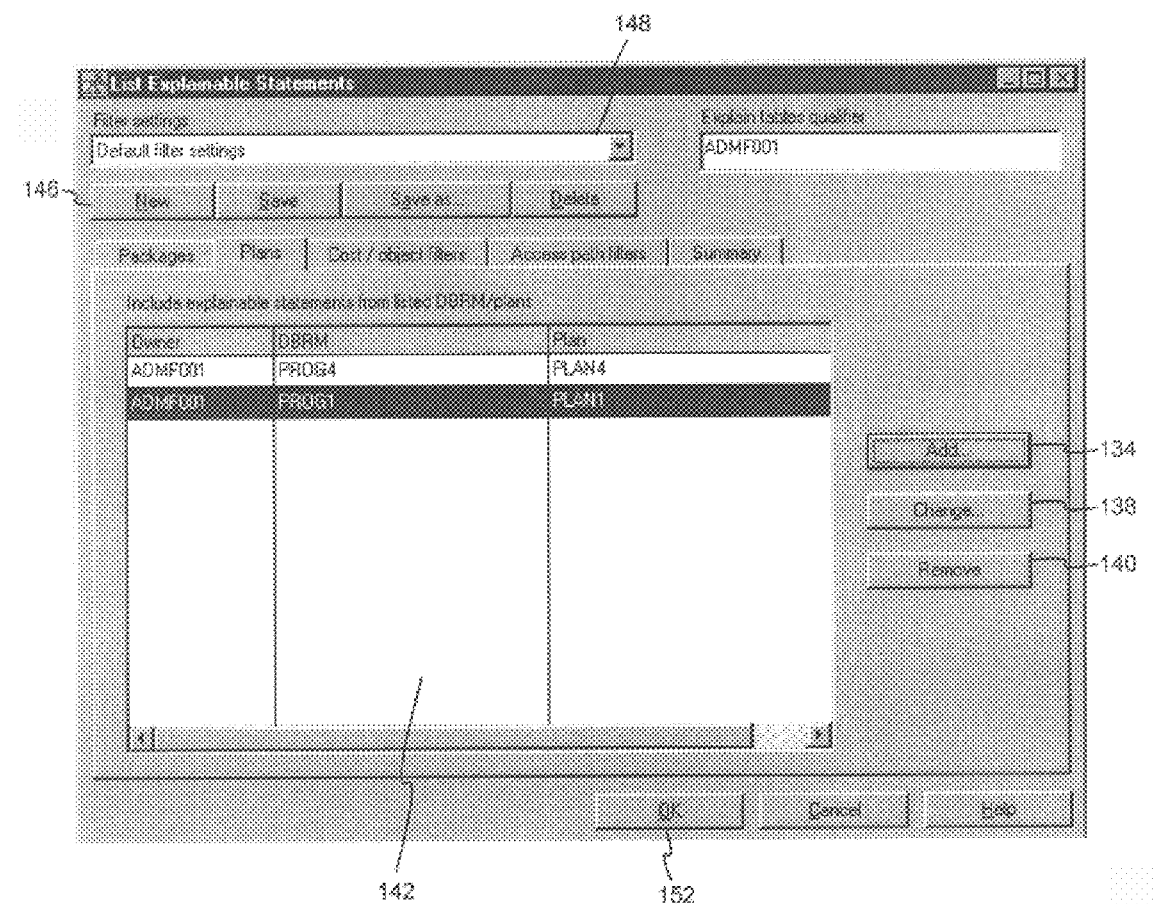
FIG. 10 is an illustration of an interactive display provided by a plan/package selection module according to one embodiment of the invention.

FIGS. 9 and 10 are illustrations of interactive displays, generated by the statement selection module 100 for receiving a user's selection of one or more plans and/or packages. FIG. 9 illustrates an interactive display for selecting packages according to one embodiment of the invention. Preferably, the statement selection module 100 provides an "add" button 134, or a similar control, through which the user may select to add one or more packages to a selected package list 136. In one embodiment, the user may add packages by name or by performing a search of the packages based on such criteria as package owner, package name, collection ID, and version.

In one embodiment, the selection module 100 employs a control such as a "change" button 138 for changing one or more of the selected packages in the selected package list 136. In addition, the selection module 100 may include a "remove" button 140 or similar control for removing one or more of the selected packages.

FIG. 10 illustrates an interactive display for selecting plans according to one embodiment of the invention. Preferably, the selection module 100 provides a control such as an "add" button 134 for adding one or more plans to a selected plan list 142. As noted above, a plan is similar to a package but may include query statements for more than one application.

Figure 11:
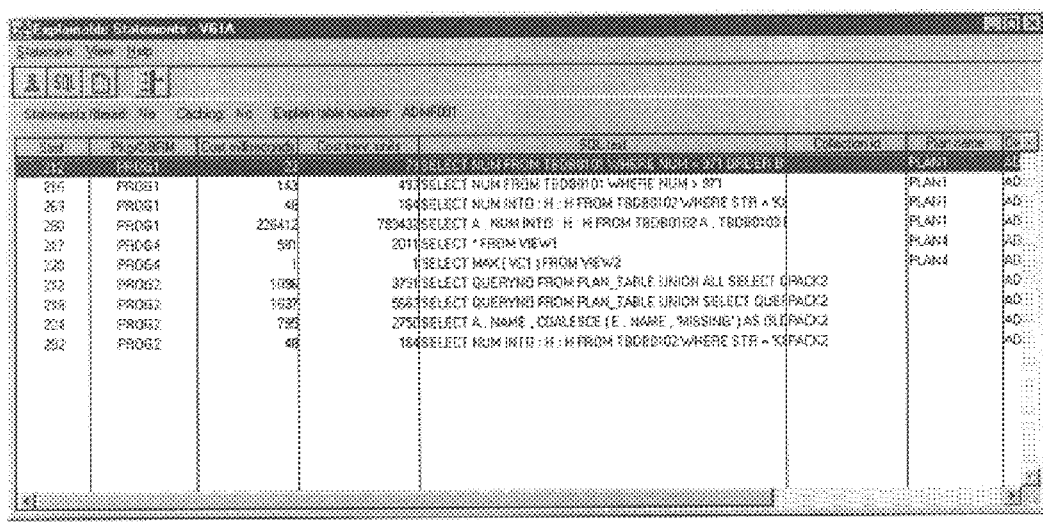
FIG. 11 is an illustration of an unfiltered list of query statements according to one embodiment of the invention.

After the user's selection of plans and/or packages is received, the method continues by receiving 150 user-specified filtering criteria, if any, for an object filter 106. It should be recognized that a user is not required in one embodiment to create a complete set of filters or, indeed, any filters. Thus, if the user selects an "OK" button 152 (of FIG. 10) or the like without creating any filters, the statement listing module 124 (of FIG. 7) preferably lists all of the query statements in the selected plans and/or packages. FIG. 11 illustrates an unfiltered listing of the plurality of query statements for the selected plans of FIG. 10. If the user does not define an object filter 106, the method simply proceeds with step 168.

Figure 12:
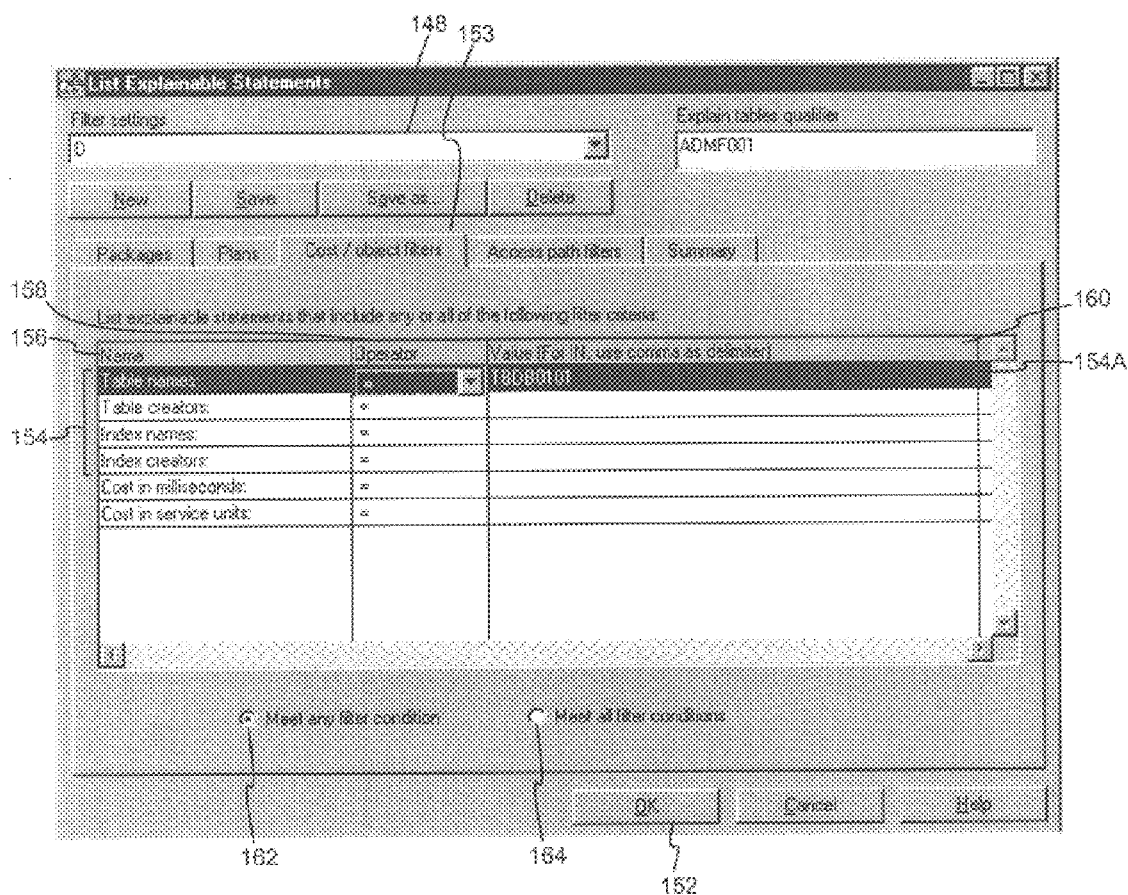
FIG. 12 is an illustration of an interactive display provided by an object filter generation module according to one embodiment of the invention.

FIG. 12 is an illustration of an interactive display provided by the object filter generator 104 for receiving user-specified filtering criteria of an object filter 106. In the depicted embodiment, the interactive display for the object filter generator 104 is shared with the cost filter generator 108. However, in alternative embodiments, separate interactive displays are provided. Preferably, the interactive display for the cost filter generator 108 is selectively displayed by means of a suitable control such as a "Cost/object filters" tab 153.

In one embodiment, the interactive display includes a set of customizable relational expressions 154 for specifying filtering criteria of an object filter 106. Each relational expression preferably represents an individual filtering criterion that is applied to the object reference data for each query statement. Although the following description illustrates a preferred user interface, a variety of other user interfaces may be employed within the scope of the invention.

In the depicted embodiment, each relational expression 154 includes three fields: a name field 156, an operator field 158, and a value field 160. The name field 156 preferably represents a type of database object referenced by a query statement, such as a table or an index. In addition, the name field 156 may represent an object creator, i.e. a person who created one or more referenced objects.

The operator field 158 is preferably selectable from a number of relational operators, such as "equal to," "not equal to," "greater than," "less than," "in" or "like." In one embodiment, the operator field 158 may be selected using a pull down menu or similar mechanism.

Preferably, the value field 160 stores the name of a specific object or a name of a specific object creator. In one embodiment, the value field 160 is specified using a text entry field or like mechanism.

For example, as shown in FIG. 12, the expression 154A includes "Table names" in the name field 156, "=" in the operator field 158, and "TBDB0101" in the value field 160. Thus, in one embodiment, the resulting relational expression, "Table names=TBDB0101," specifies that only the query statements referencing the "TBDB0101" table will pass through the object filter 106; all other statements will be excluded. For example, as displayed by the statement listing module 124 in FIG. 13, each of the filtered statements references the "TBDB0101" table.

In one embodiment, a filter may include a plurality of relational expressions combined with boolean operators. In the illustrated embodiment of FIG. 12, the relational expressions 154 may be combined using a logical (inclusive) "OR" by selecting the "Meet any filter condition" option 162. Alternatively, the relational expressions 154 may be combined using a logical "AND" by selecting the "Meet all filter conditions" option 164. Other boolean operations may also be provided, such as NOT, exclusive-OR, and the like.

Figure 14:
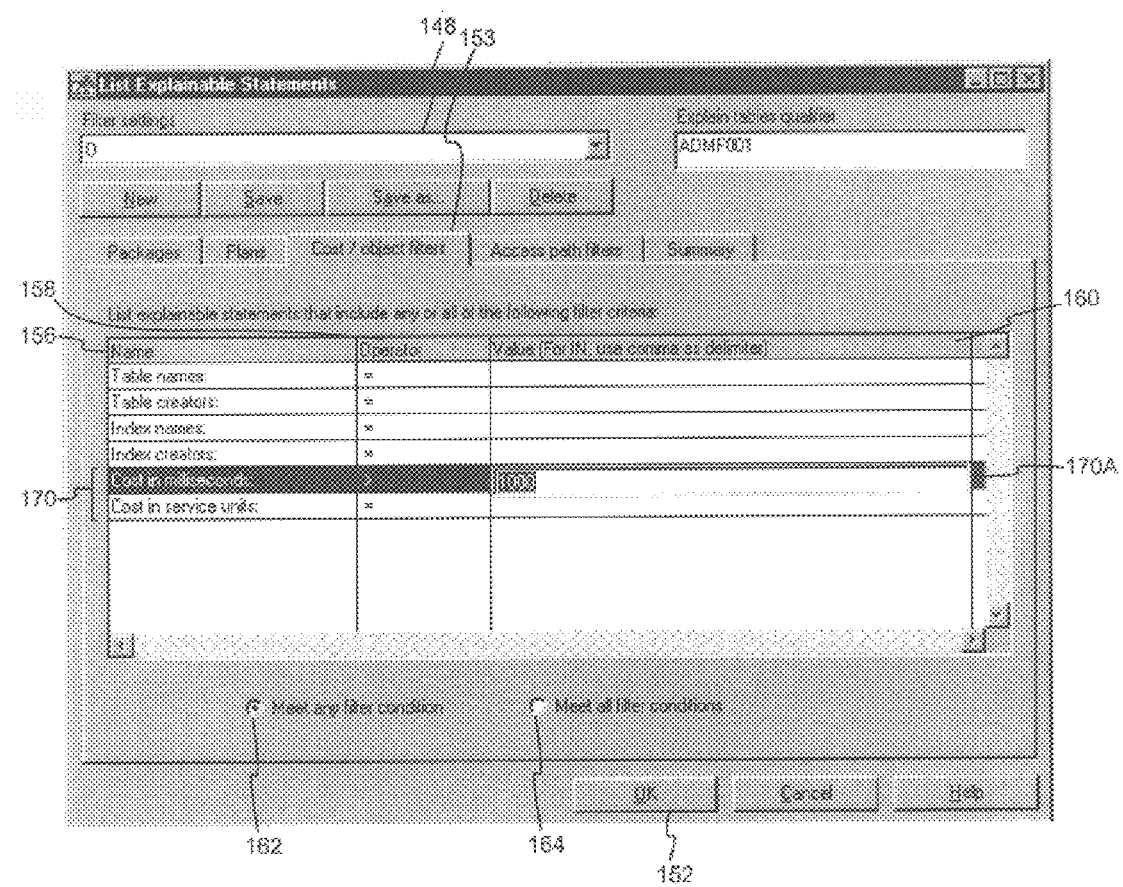
FIG. 14 is an illustration of an interactive display provided by a cost filter generation module according to one embodiment of the invention.

Referring again to FIG. 8, after the filtering criteria for the object filter 106 is received, the method continues by receiving 168 filtering criteria, if any, for a cost filter 110. FIG. 14 is an illustration of an interactive display provided by the cost filter generator 108 for receiving user-specified filtering criteria of a cost filter 110. Preferably, the interactive display for the cost filter generator 108 may be selectively displayed by means of the "Cost/object filters" tab 153.

In one embodiment, the interactive display includes a set of customizable relational expressions 170 for specifying the filtering criteria for a cost filter 110. Each relational expression 170 preferably represents an individual filtering criterion that is applied to the statement cost data for each query statement.

The relational expressions 170 for the cost filter 110 are similar in form to those of the object filter 106. However, the name field 156 preferably represents cost units for measuring the cost of executing the query statement. In one embodiment, the cost units are either milliseconds or service units. Service units are a measure of a computer's processing resources needed to execute the query statement. The value field 160 preferably stores a threshold cost to be compared with the statement cost of each query statement.

For example, as shown in FIG. 14, the expression 170A includes "Cost in milliseconds" in the name field 156, ">" in the operator field 158, and "1000" in the value field 160. Thus, the relational expression, "Cost in milliseconds >1000" specifies that only those query statements with an estimated cost greater than 1000 milliseconds will pass through the cost filter 110; all other statements will be excluded. For example, as displayed by the statement listing module 124 in FIG. 15, each of the filtered statements has a cost greater than 1000 milliseconds.

Figure 16:
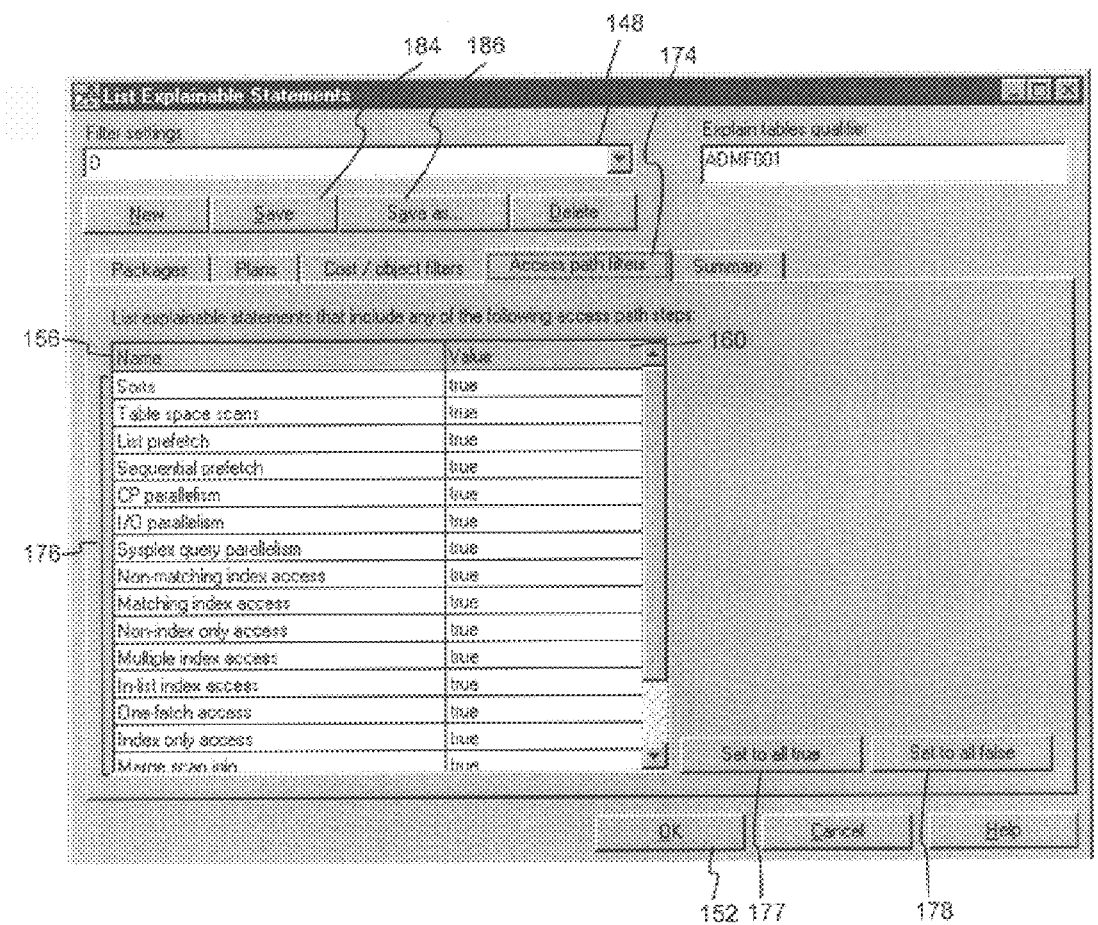
FIG. 16 is an illustration of an interactive display provided by an access path filter generation module according to one embodiment of the invention.

Referring again to FIG. 8, after the filtering criteria for the cost filter 110 is received, the method continues by receiving 172 filtering criteria, if any, for an access path filter 114. FIG. 16 is an illustration of an interactive display provided by the access path filter generator 112 for receiving user-specified filtering criteria of an access path filter 114. Preferably, the interactive display for the access path filter generator 112 is selectively displayed by means of an "Access path filters" tab 174.

In one embodiment, the access path filter generator 112 displays a plurality of customizable boolean expressions 176. Preferably, each of the boolean expressions 176 represents access path steps. For example, as depicted in FIG. 16, the access path steps may include sorts, table space scans, and the like.

In one embodiment, each of the boolean expressions 176 include a name field 156 and a value field 160. The name field 156 preferably includes a type of access path step. The value field 160 is preferably a truth value, i.e. true or false. In one embodiment, the value field 160 is selectively changeable by clicking on the associated field with a mouse or other pointing device.

Query statements are preferably allowed to pass through the access path filter 114 if the statements include any of the access path steps having a value field 160 of true. In one embodiment, the individual boolean expressions 176 are combined using a logical OR. In alternative embodiments, the expressions 176 may be combined using other boolean operators, such as AND.

In one embodiment, the access path filter generator 112 provides a "Set to all true" button 177 for conveniently setting all of the value fields 160 to true. Likewise, the access path filter generator 112 provides a "Set to all false" button 178 for setting all of the value fields 160 to false.

Figure 17:
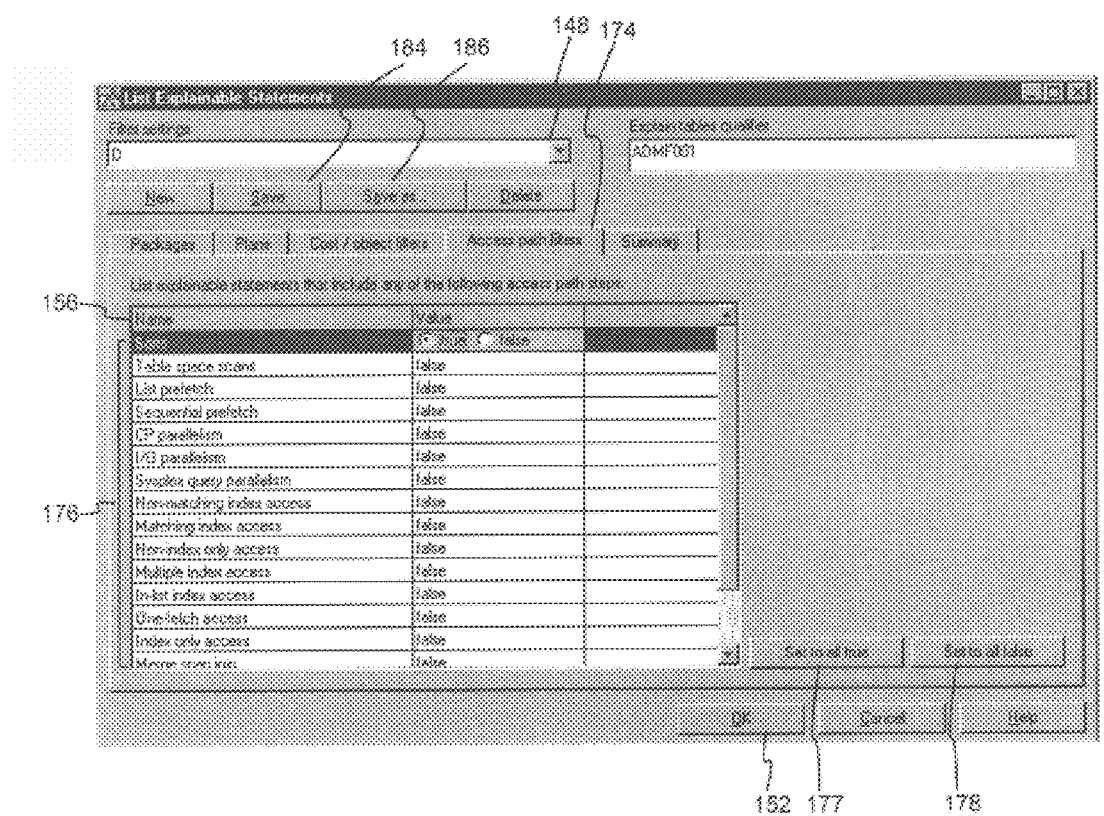
FIG. 17 is an illustration of an interactive display provided by an access path filter generation module according to one embodiment of the invention.

As illustrated in FIG. 17, a user may desire to see a list of query statements including sorts in the statements' access paths. This may be accomplished in one embodiment by setting all of the value fields 160 to false using the "Set all to false" button 178 and changing the "Sorts" value field 160 to true. Accordingly, when the access path filter 114 is applied, only the statements having sorts are displayed. For example, as displayed by the statement listing module 124 in FIG. 18, all of the listed query statements include sorts in the statements' access paths.

After the filtering criteria for the access path filter 114 is received, the method continues by creating 180 the filters corresponding to the user-defined filtering criteria. In one embodiment, the filters are data structures including representations of the relational expressions 154, 170 and boolean expressions 176. In addition, each filter may include, in one embodiment, the selection of plans and/or packages made by the user in step 144. The type of data structure is not crucial to the invention. However, it is preferred that the statement filtering module 116 is capable of interpreting the data structures to obtain the relational expressions 154, 170 and boolean expressions 176, for the filtering criteria, as well as the plan/package selection.

After the filters are created, the method continues by determining 182 whether to save the user-specified filter(s) as a set 130 in the filter storage 94. The user may elect (or may have previously elected) to give a name to a set 130 of filters and store the set 130 by means of the "Save" or "Save as" buttons 184, 186.

If the user selects one of the foregoing buttons 184, 186, the method continues with step 188 by receiving the name of the filter set 130 (if not previously provided) and storing the filter set 130 in the filter storage 94 using the specified name; otherwise, the method continues with step 192.

As previously noted in step 144, a user may elect to retrieve a stored filter set 130, rather than creating new filters by means of the filter generation module 102. This is accomplished, in one embodiment, by selecting a set 130 from a pull down menu 148, which lists the names of the filter sets 130 stored in the filter storage 94. Thus, if the user elects to retrieve a stored set in step 144, the method continues by receiving 190 a name of a user-specified filter set 130 and retrieving the set 130 from the filter storage 94.

In one embodiment, the user may elect to modify the retrieved filter 190 using the techniques described in steps 150, 168, and 172. As noted above, the filters may include, in one embodiment, the selection of plans and/or packages made by the user in step 144. However, in an alternative embodiment, the user may proceed to specify a new or different set of plans and/or packages as described in step 132.

After the completion of either steps 182, 188, or step 190, one or more filters will have been generated and/or retrieved. Preferably, the user requests a list of filtered statements by selecting the "OK" button 152. Thereafter, the method continues by applying 192 the object filter 106, if any, to the query statements. After the object filter 106 is applied, the method continues by applying 194 the cost and access path filters 110, 114 if any were defined.

Figure 13:
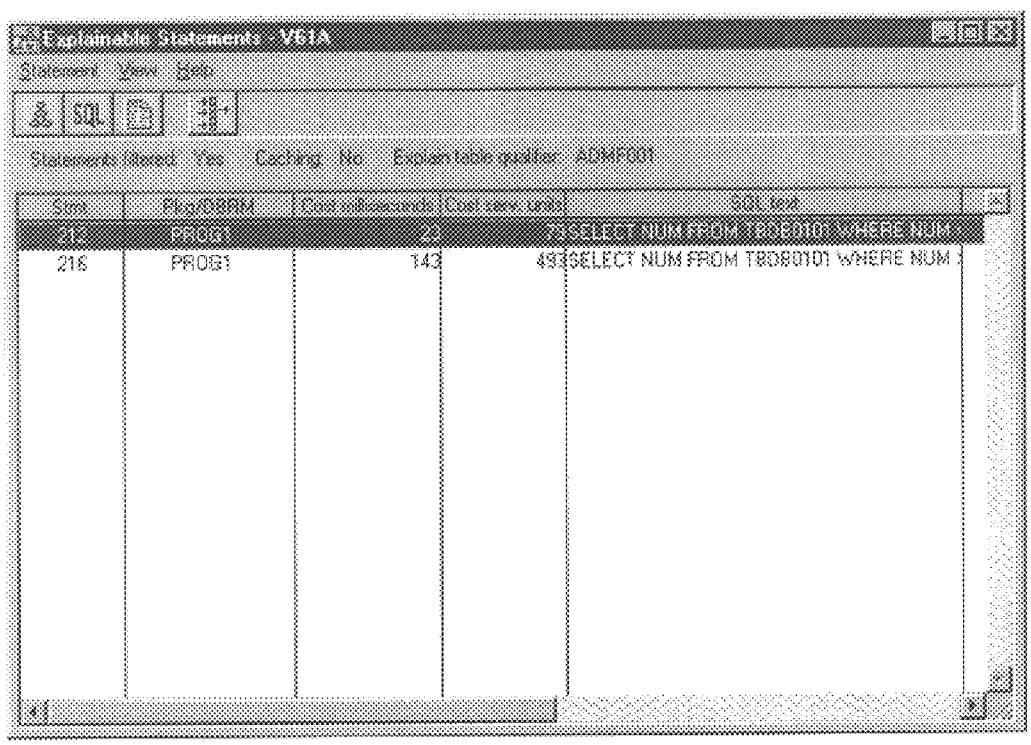
FIG. 13 is an illustration of a filtered list of query statements according to one embodiment of the invention.

When the filtering process is complete, the statement listing module 124 displays a list of the filtered query statements to the user. As shown in FIG. 13, the statement listing may include such information as a statement number, a package name, a cost in milliseconds, a cost in service units, the SQL text of the query statement, a collection ID, a plan name, and an owner name.

Figure 15:
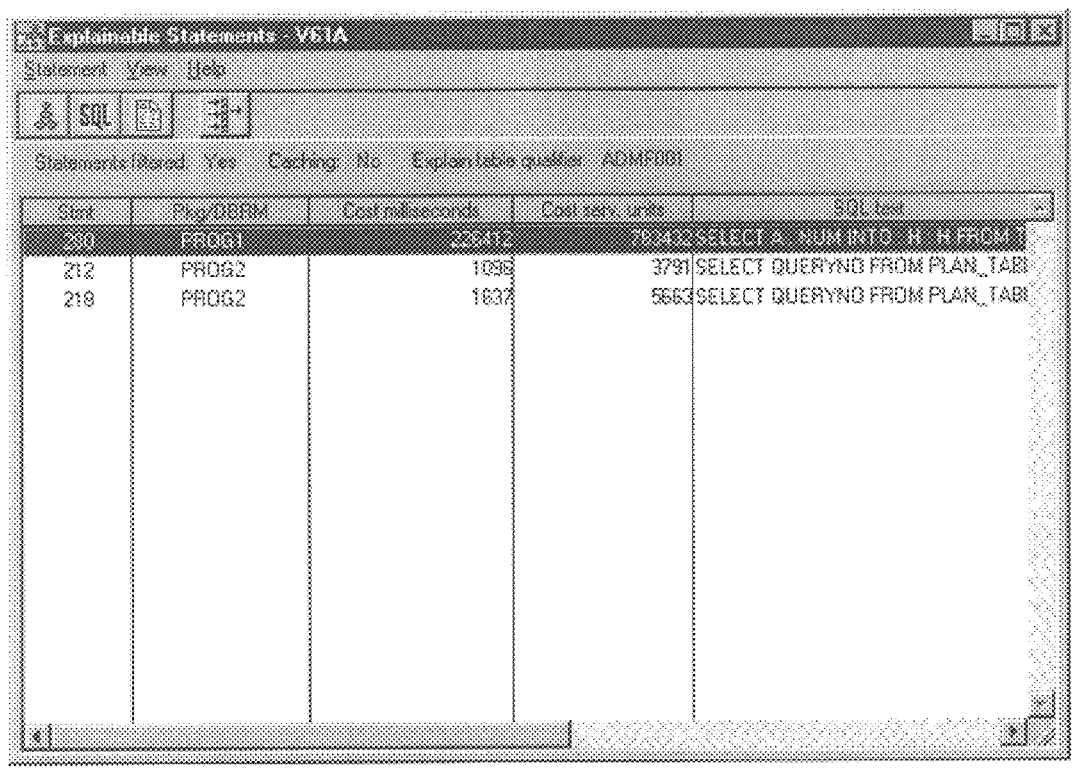
FIG. 15 is an illustration of a filtered list of query statements according to one embodiment of the invention.
Figure 18:
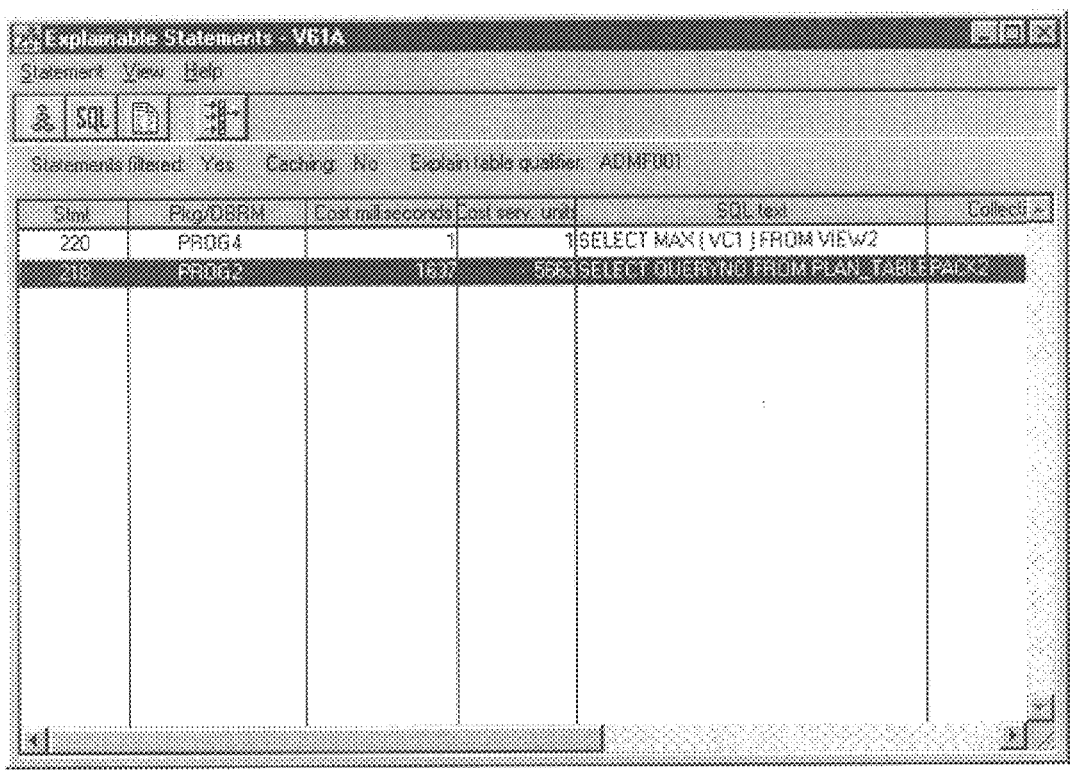
FIG. 18 is an illustration of a filtered list of query statements according to one embodiment of the invention.

Additionally, in one embodiment, the statement listing module 124 allows the user to select a filtered statement for graphing, for SQL text display, for generation of a report containing the statement, or the like. FIGS. 13, 15, and 18 illustrate an interactive display generated by the statement listing module 124 for listing the filtered query statements according to one embodiment of the invention.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for filtering a set of query statements according to query explain data associated therewith, the query explain data generated by a database and indicating how the database will execute the query statements, the apparatus comprising:
   a memory device having thereon modules of code for execution by a processor,
   the modules comprising:
      a filter generation module configured to receive user-specified filtering criteria directed to a subset of the query explain data for at least one query statement and generate in response at least one user-defined filter; and
      a statement filtering module configured to apply the user-defined filter to the set of query statements to selectively exclude, query statements not satisfying the filtering criteria of the at least one user-defined filter.

2. The apparatus of claim 1, wherein the query explain data comprises object reference data including one or more objects in the database referenced by each query statement, the at least one user-defined filter comprising:
   an object filter comprising filtering criteria for selectively excluding from the set the query statements not referencing a specified object.

3. The apparatus of claim 1, wherein the query explain data comprises object reference data including one or more objects in the database referenced by each query statement, the at least one user-defined filter comprising:
   an object filter comprising filtering criteria for selectively excluding from the set the query statements referencing a specified object.

4. The apparatus of claim 1, wherein the query explain data comprises object reference data including one or more objects in the database referenced by each query statement, the object reference data further comprising object creator data including an indication of a person who created each object, the at least one user-defined filter comprising:

an object filter comprising filtering criteria for selectively excluding from the set the query statements referencing database objects not created by a specified person.

5. The apparatus of claim 1, wherein the query explain data comprises object reference data including one or more objects in the database referenced by each query statement, the object reference data further comprising object creator data including an indication of a person who created each object, the at least one user-defined filter comprising:

an object filter comprising filtering criteria for selectively excluding from the set the query statements referencing database objects created by a specified person.

6. The apparatus of claim 1, wherein the query explain data comprises statement cost data including an estimated cost generated by the database for executing each query statement, the at least one user-defined filter comprising:

a cost filter comprising filtering criteria for selectively excluding from the set the query statements having an estimated cost below a specified cost.

7. The apparatus of claim 1, wherein the query explain data comprises statement cost data including an estimated cost generated by the database for executing each query statement, the at least one user-defined filter comprising:

a cost filter comprising filtering criteria for selectively excluding from the set the query statements having an estimated cost above a specified cost.

8. The apparatus of claim 1, wherein the query explain data comprises statement cost data including an estimated cost generated by the database for executing each query statement, the at least one user-defined filter comprising:

a cost filter comprising filtering criteria for selectively excluding from the set the query statements having an estimated cost equal to a specified cost.

9. The apparatus of claim 1, wherein the query explain data comprises access path data including execution steps generated by the database for executing each query statement, the at least one user-defined filter comprising:

an access path filter comprising filtering criteria for selectively excluding from the set the query statements not including a specified execution step in the access path data.

10. The apparatus of claim 1, wherein the query explain data comprises access path data including execution steps generated by the database for executing each query statement, the at least one user-defined filter comprising:

an access path filter comprising filtering criteria for selectively excluding from the set the query statements including a specified execution step in the access path data.

11. The apparatus of claim 1, further comprising:

a display module configured to display the filtered set of query statements to a user.

12. The apparatus of claim 1, further comprising:

a filter storage module configured to store a set of filters generated by the filter generation module in a filter storage.

13. The apparatus of claim 12, further comprising:

a display module configured to retrieve a stored set of filters from the filter storage, invoke the statement filtering module to apply the retrieved of filters to the set of query statements, and display the filtered set of query statements to a user.

14. The apparatus of claim 1, wherein the filter generation module is further configured to receive from a user one or more relational expressions for generating the filtering criteria.

15. The apparatus of claim 14, wherein the filter generation module is further configured to receive from a user boolean operator for logically combining at least two relational expressions, wherein the boolean operator is selected from the group consisting of OR and AND.

16. The apparatus of claim 14, wherein the filter generation module is further configured to receive from a user at least one relational expressions of the form NAME OPERATOR VALUE, wherein NAME comprises one of an object, an object creator, and a unit for measuring statement cost; wherein OPERATOR comprises one of GREATER THAN, LESS THAN, EQUAL TO, NOT EQUAL TO, IN, and LIKE; and wherein VALUE comprises one of a name of an object, a name of an object creator, and a cost value.

17. The apparatus of claim 1, further comprising:

a filter customization module configured to provide an interactive display including one or more customizable filtering criteria, the filter customization module configured to permit a user to customize the customizable filtering criteria to generate the at least one user-defined filter.

18. A method for filtering a set of query statements according to query explain data associated therewith, the query explain data generated by a database and indicating how the database will execute the query statements, the method comprising:

receiving user-specified filtering criteria directed to a subset of the query explain data for at least one query statement and generating in response at least one user-defined filter; and applying the user-defined filter to the set of query statements to selectively exclude query statements not satisfying the filtering criteria of the at least one user-defined filter.

19. The method of claim 18, wherein the query explain data comprises object reference data including one or more objects in the database referenced by each query statement, the applying step comprising:

selectively excluding from the set the query statements not referencing a specified object.

20. The method of claim 18, wherein the query explain data comprises object reference data including one or more objects in the database referenced by each query statement, the applying step comprising:

selectively excluding from the set the query statements referencing a specified object.

21. The method of claim 18, wherein the query explain data comprises object reference data including one or more objects in the database referenced by each query statement, the object reference data further comprising object creator data including an indication of a person who created each object, the applying step comprising:

selectively excluding from the set the query statements referencing database objects not created by a specified person.

22. The method of claim 18, wherein the query explain data comprises object reference data including one or more objects in the database referenced by each query statement, the object reference data further comprising object creator data including an indication of a person who created each object, the applying step comprising:

selectively excluding from the set the query statements referencing database objects not created by a specified person.

23. The method of claim 18, wherein the query explain data comprises statement cost data including an estimated cost generated by the database for executing each query statement, the applying step comprising:

selectively excluding from the set the query statements having an estimated cost below a specified cost.

24. The method of claim 18, wherein the query explain data comprises statement cost data including an estimated cost generated by the database for executing each query statement, the applying step comprising:

selectively excluding from the set the query statements having an estimated cost above a specified cost.

25. The method of claim 18, wherein the query explain data comprises statement cost data including an estimated cost generated by the database for executing each query statement, the applying step comprising:

selectively excluding from the set the query statements having an estimated cost equal to a specified cost.

26. The method of claim 18, wherein the query explain data comprises access path data including execution steps generated by the database for executing each query statement, the applying step comprising:

selectively excluding from the set the query statements not including a specified execution step in the access path data.

27. The method of claim 18, wherein the query explain data comprises access path data including execution steps generated by the database for executing each query statement, the applying step comprising:

selectively excluding from the set the query statements including a specified execution step in the access path data.

28. The method of claim 18, further comprising:
displaying the filtered set of query statements to a user.

29. The method of claim 18, further comprising:
receiving a user-specified name for a set of filters; and
storing the set of filters in a filter storage.

30. The method of claim 18, further comprising:
receiving a user-specified name for a set of filters;
retrieving the named set of filters from a filter storage; and
applying the named set of filters to the set of query statements.

31. The method of claim 18, further comprising:
receiving from a user one or more relational expressions for generating the filtering criteria.

32. The method of claim 31, further comprising:
receiving from a user a boolean operator for logically combining at least two of the relational expressions, wherein the boolean operator selected from the group consisting of OR and AND.

33. The method of claim 31, further comprising:
receiving from a user at least one relational expression of the form NAME OPERATOR VALUE, wherein NAME comprises one of an object, an object creator, and a unit for measuring statement cost; wherein OPERATOR comprises one of GREATER THAN, LESS THAN, EQUAL TO, NOT EQUAL TO, IN, and LIKE; and wherein VALUE comprises one of a name of an object, a name of an object creator, and a cost value.

34. The method of claim 18, further comprising:
providing an interactive display including one or more customizable filtering criteria; and
permitting a user to customize the customizable filtering criteria to generate the at least one user-defined filter.

35. An article of manufacture comprising a program storage medium readable by a processor and embodying one or more instructions executable by the processor to perform a method for filtering a set of query statements according to query explain data associated therewith, the query explain data generated by a database and indicating how the database will execute the query statements, the method comprising:

receiving user-specified filtering criteria directed to a subset of the query explain data for at least one query statement and generating in response at least one user-defined filter; and applying the user-defined filter to the set of query statements to selectively exclude query statements not satisfying the filtering criteria of the at least one user-defined filter.

36. The article of manufacture of claim 35, wherein the query explain data comprises object reference data including one or more objects in the database referenced by each query statement, the applying step comprising:

selectively excluding from the set the query statements not referencing a specified object.

37. The article of manufacture of claim 35, wherein the query explain data comprises object reference data including one or more objects in the database referenced by each query statement, the applying step comprising:

selectively excluding from the set the query statements referencing a specified object.

38. The article of manufacture of claim 35, wherein the query explain data comprises object reference data including one or more objects in the database referenced by each query statement, the object reference data further comprising object creator data including an indication of a person who created each object, the applying step comprising:

selectively excluding from the set the query statements referencing database objects not created by a specified person.

39. The article of manufacture of claim 35, wherein the query explain data comprises object reference data including one or more objects in the database referenced by each query statement, the object reference data further comprising object creator data including an indication of a person who created each object, the applying step comprising:

selectively excluding from the set the query statements referencing database objects not created by a specified person.

40. The article of manufacture of claim 35, wherein the query explain data comprises statement cost data including an estimated cost generated by the database for executing each query statement, the applying step comprising:

selectively excluding from the set the query statements having an estimated cost below a specified cost.

41. The article of manufacture of claim 35, wherein the query explain data comprises statement cost data including an estimated cost generated by the database for executing each query statement, the applying step comprising:

selectively excluding from the set the query statements having an estimated cost above a specified cost.

42. The article of manufacture of claim 35, wherein the query explain data comprises statement cost data including an estimated cost generated by the database for executing each query statement, the applying step comprising:

selectively excluding from the set the query statements having an estimated cost equal to a specified cost.

43. The article of manufacture of claim 35, wherein the query explain data comprises access path data including execution steps generated by the database for executing each query statement, the applying step comprising:

selectively excluding from the set the query statements not including a specified execution step in the access path data.

44. The article of manufacture of claim 35, wherein the query explain data comprises access path data including execution steps generated by the database for executing each query statement, the applying step comprising:

selectively excluding from the set the query statements including a specified execution step in the access path data.

45. The article of manufacture of claim 35, the method further comprising:

displaying the filtered set of query statements to a user.

46. The article of manufacture of claim 35, the method further comprising:

receiving a user-specified name for a set of filters; and storing the set of filters in a filter storage.

47. The article of manufacture of claim 35, the method further comprising:

receiving a user-specified name for a set of filters;

retrieving the named set of filters from a filter storage; and applying the named set of filters to the set of query statements.

48. The article of manufacture of claim 35, the method further comprising:

receiving from a user one or more relational expressions for generating the filtering criteria.

49. The article of manufacture of claim 48, the method further comprising:

receiving from a user a boolean operator for logically combining at least two of the relational expressions, wherein the boolean operator selected from the group consisting of OR and AND.

50. The article of manufacture of claim 48, the method further comprising:

receiving from a user at least one relational expression of the form NAME OPERATOR VALUE, wherein NAME comprises one of an object, an object creator, and a unit for measuring statement cost; wherein OPERATOR comprises one of GREATER THAN, LESS THAN, EQUAL TO, NOT EQUAL TO, IN, and LIKE; and wherein VALUE comprises one of a name of an object, a name of an object creator, and a cost value.

51. The article of manufacture of claim 35, the method further comprising:

providing an interactive display including one or more customizable filtering criteria; and permitting a user to customize the customizable filtering criteria to generate the at least one user-defined filter.

* * * * *